US009529389B1

(12) United States Patent
Peters et al.

(10) Patent No.: US 9,529,389 B1
(45) Date of Patent: Dec. 27, 2016

(54) VARIABLE PLATED DEVICE ENCLOSURE

(71) Applicant: Amazon Technologies, Inc., Seattle, WA (US)

(72) Inventors: David Eric Peters, San Jose, CA (US); Shankar Ganapathysubramanian, Cupertino, CA (US); Mohammed Aftab Alam, San Jose, CA (US); Vikram Srinivas, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 106 days.

(21) Appl. No.: 14/496,450

(22) Filed: Sep. 25, 2014

(51) Int. Cl.
*G06F 1/16* (2006.01)
*B32B 38/10* (2006.01)

(52) U.S. Cl.
CPC ............ *G06F 1/1637* (2013.01); *B32B 38/10* (2013.01); *G06F 1/1601* (2013.01); *B32B 2439/00* (2013.01)

(58) Field of Classification Search
CPC .................................................... H02G 3/081
See application file for complete search history.

(56) References Cited

U.S. PATENT DOCUMENTS

| | | | | |
|---|---|---|---|---|
| 5,186,802 A * | 2/1993 | Kadokura | ............. | C25D 13/00 174/50 |
| 6,313,400 B1 * | 11/2001 | Mosquera | ............. | H05K 5/026 174/363 |
| 6,576,832 B2 * | 6/2003 | Svarfvar | ............. | H05K 9/0047 174/392 |
| 6,627,814 B1 * | 9/2003 | Stark | .................... | B81B 7/0067 174/539 |
| 7,947,900 B2 * | 5/2011 | Cheng | .................... | B32B 15/01 174/50 |
| 8,000,103 B2 * | 8/2011 | Lipp | .................. | F28D 1/05316 165/104.33 |
| 8,492,651 B2 * | 7/2013 | Schindler | ............. | H05K 5/061 174/50 |
| 8,498,113 B2 * | 7/2013 | Tran | .................. | H03M 13/1102 174/50 |
| 8,599,540 B2 * | 12/2013 | Fernandez | ............. | H04Q 1/025 174/17 R |
| 8,873,226 B1 * | 10/2014 | Peters | .................. | G06F 1/1613 361/679.01 |
| 9,121,983 B1 * | 9/2015 | Cantos | ................ | G02B 6/0055 |
| 9,218,020 B1 * | 12/2015 | Martinez | ............. | G06F 1/1613 |

(Continued)

*Primary Examiner* — Lisa Lea Edmonds
(74) *Attorney, Agent, or Firm* — Seyfarth Shaw LLP; Ilan N. Barzilay; Joseph M. Walker

(57) ABSTRACT

A housing of a computing device, such as a computer, laptop computer, cellular phone, personal digital assistant (PDA), tablet computer, electronic reader or e-reader, or other mobile device constructed using a combination of a metal material and a lightweight core material. The housing includes a front housing component including a display and a rear housing coupled to the front housing component with an internal side of the rear housing facing the front housing. The rear housing component includes a core material and a structural material coupled to the core material at strategic locations. For example, the structural material may be located around a periphery of the rear housing, around connection ports of the electronic device, and diagonally across the external side to provide strength and stiffness to the rear housing.

16 Claims, 17 Drawing Sheets

(56) References Cited

U.S. PATENT DOCUMENTS

| | | | |
|---|---|---|---|
| 2003/0015334 A1* | 1/2003 | Clement | H05K 9/0045 174/50 |
| 2003/0066672 A1* | 4/2003 | Watchko | C23C 4/00 174/50 |
| 2009/0194308 A1* | 8/2009 | Cheng | B32B 15/01 174/50 |
| 2010/0270052 A1* | 10/2010 | Crohas | B29C 45/14 174/50 |
| 2010/0326722 A1* | 12/2010 | Watazu | B32B 15/02 174/565 |
| 2011/0005796 A1* | 1/2011 | Wu | B44C 1/1725 174/50 |
| 2011/0059275 A1* | 3/2011 | Stark | C03C 27/08 428/34 |
| 2011/0155452 A1* | 6/2011 | Liu | B29C 45/0053 174/535 |
| 2011/0186345 A1* | 8/2011 | Pakula | G06F 1/1626 174/520 |
| 2011/0240361 A1* | 10/2011 | Bardia | H05K 5/0026 174/520 |
| 2011/0247854 A1* | 10/2011 | Chen | H05K 5/0243 174/50 |
| 2012/0255759 A1* | 10/2012 | Pullium, III | H01R 4/70 174/50 |
| 2013/0076573 A1 | 3/2013 | Rappoport | |
| 2013/0087358 A1* | 4/2013 | Leslie | F16J 15/061 174/50 |
| 2013/0127684 A1 | 5/2013 | Li | |
| 2013/0329460 A1* | 12/2013 | Mathew | H05K 5/02 362/612 |
| 2013/0333941 A1* | 12/2013 | Snider | H05K 9/0043 174/535 |
| 2013/0342495 A1* | 12/2013 | Rappoport | H05K 9/0054 345/174 |
| 2014/0054058 A1* | 2/2014 | Myers | G06F 1/1626 174/50 |
| 2014/0055962 A1* | 2/2014 | Kim | H05K 5/0086 361/748 |
| 2014/0111388 A1 | 4/2014 | Di Nallo | |
| 2014/0233167 A1* | 8/2014 | Rayner | G06F 1/1656 361/679.3 |
| 2014/0284096 A1* | 9/2014 | Wu | H05K 5/04 174/520 |
| 2014/0334077 A1* | 11/2014 | Kwong | H04M 1/0249 361/679.01 |

* cited by examiner

VARIABLE PLATED DEVICE ENCLOSURE

BACKGROUND

Electronic devices, such as computers, laptop computers, cellular phones, personal digital assistants (PDA), tablet computers and other mobile devices, include a number of parts. These parts include, for example, an outer housing, made of metal or a plastic material.

BRIEF DESCRIPTION OF DRAWINGS

For a more complete understanding of the present disclosure, reference is now made to the following description taken in conjunction with the accompanying drawings.

DETAILED DESCRIPTION

Figure 1:
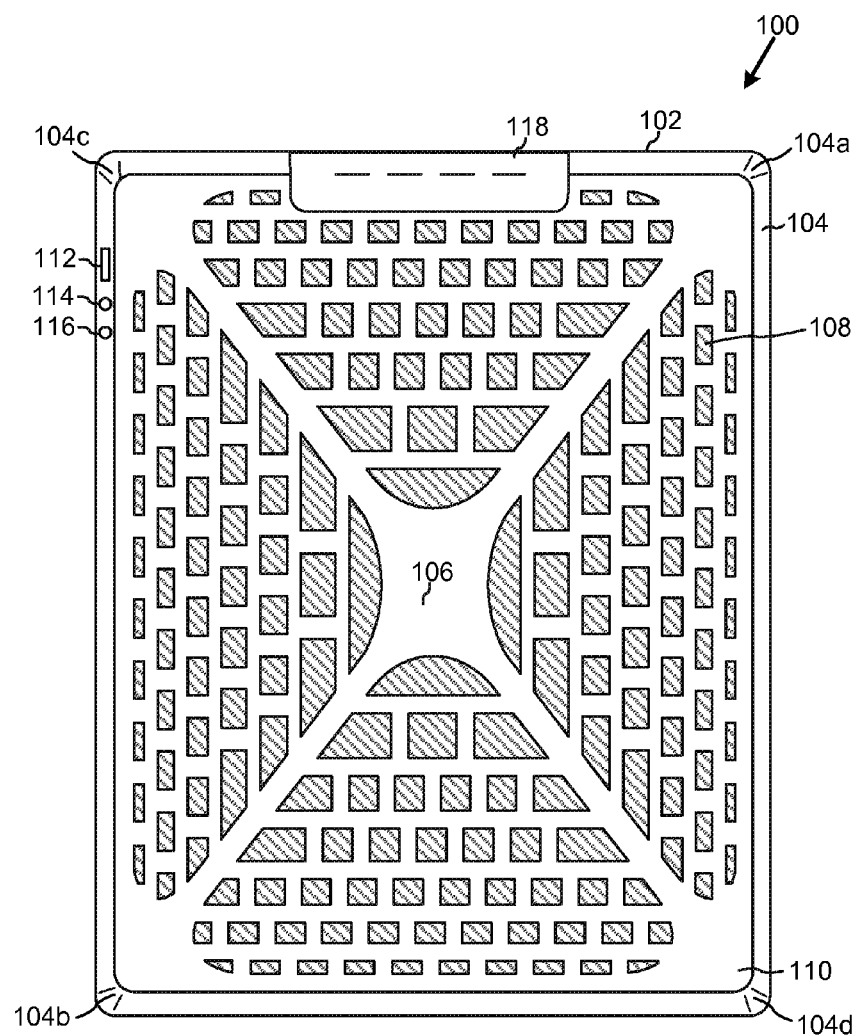
FIG. 1 illustrates a rear view of a device housing according to an aspect of the disclosure.

Aspects of the present disclosure include devices and methods for making and using structural components using combinations of materials. In one aspect, the disclosure combines the use of metals (for example, aluminum, titanium, magnesium, stainless steel, nickel, copper, tin, chromium, and/or cobalt, etc.) with lightweight composites, such as foams, mesh materials, plastics and other polymers, etc. In an example, a housing of a computing device, such as a computer, laptop computer, cellular phone, personal digital assistant (PDA), tablet computer, electronic reader or e-reader, or other mobile device may be constructed by disposing or removing metal or other structural material from a lightweight core material at selected locations.

In general, the core material may be fiber based material (such as a layered fiber mesh) and/or a polymer with a low density (such as a thermoset, a thermo plastic or other polymers), and the structural material may be a metal coating disposed on the core material at certain locations, such as areas of high stress or areas near or at vital components of the computing device. For example, the structural material may comprise a relatively expensive but strong material that can complement the core material's lightweight properties by providing structural support and reinforcement, resulting in the core material being protected from physical deformation, such as bending and/or puncture damage at strategic locations. The structural material may optionally provide additional protection to provide one or more of protection from water damage, temperature effects, or the like. In one aspect, the structural material is a metal or metallic composite. The core material may be plated with one or more structural material layers.

Typically, a device housing, such as a rear housing or closure, is made of a single homogeneous material, such as aluminum or magnesium. However, such metal materials can be stiff, causing the metal materials to break or fail if subjected to significant forces that may be caused by various reasons, including abuse of a user. Other materials, such as polymers and/or carbon fiber may also be used, but carbon fiber is difficult to shape into a 3-D monolithic single piece rear housing and polymers (such as thermoplastics and thermosets) can be structurally weak in one or more directions. For example, carbon fiber type housings typically include numerous layers of sheets of fiber. While the layers may provide structural support, too many layers can cause the housing to be undesirably thick. For example, a sheet of fibers may include fibers oriented in a common direction (i.e., unidirectional). Such unidirectional sheets are anisotropic, meaning that they tend to have different physical properties in different directions. For example, such unidirectional sheets are strongest along or parallel to the primary direction of orientation of the fibers and weakest in a direction perpendicular to the fibers. To provide a housing having strength in multiple directions, multiple sheets are typically layered on top of one another with the orientation of the fibers of each layer varied so as to provide strength in multiple directions. For example, a second sheet disposed on a first sheet may be oriented to cause the direction of fibers in the second sheet to be one of 0°, 30°, 60°, 90°, etc. relative to the direction of fibers in the first sheet. Additional sheets, such as third, fourth, fifth, and sixth sheets, etc. may also be layered in a similar fashion, with rotating fiber directions, to provide strength in multiple directions. The more layers that are added the thicker the housing becomes, which can be undesirable.

Other materials, such as isotropic materials tend to have uniform physical properties in all directions. However, 3 dimensional structures formed out of such isotropic materials may also have inherent weaknesses in certain directions. For example, a housing portion having a substantially "U" shaped cross section may be stronger along X and Y axes in a plane of the housing portion than in a Z axis.

Using a combination of the structural metal material and a lightweight core material decreases the number of fiber layers (when the core layer is fibers or includes fibers), and therefore the thickness of the housing, needed to provide desired strength properties. The combination of materials decreases the weight of the computing device or other electronic device and maintains an appropriate stiffness to support glass or other types of displays and components (e.g. a battery, processor, input/output connection ports, etc.) that may be incorporated into the device. The structural material provides strength, stiffness, and durability to the core material (including isotropic and anisotropic materials) allowing the device to withstand various abuses, such as being dropped by the user.

FIG. 1 illustrates a rear housing portion 102 of a housing 100 of a computing device according to an aspect of the disclosure. In an aspect, the rear housing 102 includes a peripheral portion 104 that surrounds a rear panel or rear face 106. The rear housing 102 may be constructed of a lightweight core material 108 and a structural material 110. The lightweight core material 108 may be a fiber based material (e.g., a rigid or flexible polyurethane foam, a fiber reinforced foam, etc., or combinations thereof), plastic and/or other polymer (e.g. a thermoplastic (such as Acrylonitrile Butadiene Styrene (ABS), polycarbonate/ABS, nylon, Polyphenylene sulfide (PPS), and other thermoplastics) and/or thermoset material (such as polyurethane and other thermoset materials), etc. The structural material may be a metal, such as aluminum, titanium, magnesium, stainless steel, and combinations or composites thereof, etc. In an aspect, the structural material 110 may be aluminum, titanium, magnesium, stainless steel, tin, chromium (chrome), copper, nickel, copper-nickel, copper-cobalt, copper-nickel-chrome, nickel-chrome, cobalt, gold, silver, or other metals, and/or combinations thereof capable of being plated, such as by electroplating, onto the core material 108.

The core material 108 may extend across all or a portion of a plane of the rear housing 102 and/or throughout all or a portion of the rear housing 102. The structural material 110 may be disposed on the core material 108 in strategic locations or removed from the core material 108 in strategic locations to adjust the weight of the housing 100, while providing structural support and protection of components housed in the housing 100. For example, the core material 108 may be a fiber based material having one or more layers. The core material 108 then has strength properties that correspond to primary directions of the fiber axes of the layers. The core material 108 also has inherent weaknesses in the directions perpendicular to the fiber axes of the layers. To minimize the number of fiber layers and reduce weight and thickness, the structural material 110 is located in strategic locations relative to the predominant axes of the fiber layers to provide strength to the core material 108. The structural material 110 provides strength to the rear housing 102 of the housing 100 to resist longitudinal bending, axial tension/compression, and torsional forces, etc.

In another example, the core material 108 may be a polymer based material. The core material 108 then has strength properties that correspond to the polymer based material. In this respect, the core material 108 may have inherent weaknesses to forces applied in one or more directions, such as an X, Y, and/or Z axis. The structural material 110 provides strength and stiffness to the core material 108 and thereby to the rear housing 102 of the housing 100 to resist longitudinal bending, axial tension/compression, and torsional forces, etc.

As illustrated in FIG. 1, the peripheral portion 104 includes the lightweight core material 108 with the structural material 110 disposed on the core material 108. The rear face 106 has the structural material 110 extending across diagonals of the rear face 106 and forming an "X" like pattern in which the "X" includes the lightweight core material 108 with the structural material 110 disposed on the core material 108. For example, the structural material 110 may join a first corner 104a of the peripheral portion 104 to a second corner 104b in a first diagonal, and join a third corner 104c of the peripheral portion 104 to a fourth corner 104d in a second diagonal forming an "X" like pattern. This "X" like pattern may provide strength and stiffness to the corners and diagonally across the rear face 106.

The rear face 106 also has substantially triangular portions in which the structural material 110 is selectively absent. As illustrated, there are four substantially triangular portions in which each substantially triangular portion includes a base having first areas having a first height in which the structural material 110 is absent, second areas having a second height greater than the first height, third areas having a third height greater than the second height, fourth areas having a fourth height greater than the third height, fifth areas having a fifth height greater than the fourth height, sixth areas having a sixth height greater than the fifth height, and a seventh area proximal to the center of the rear housing 102 of the housing 100 having a seventh height greater than the sixth height. Effectively, the areas absent the structural material 110 increase in size from a periphery of the rear housing 102 toward the center of the rear housing 102. Thus, the areas of the structural material 110 decrease in surface area from proximal to the peripheral portion 104 in a direction toward a center of the rear housing 102 and the areas absent the structural material 110 increase in surface area from proximal to the peripheral portion 104 in a direction toward a center of the rear housing 102.

The structural material 110 coated on the core material 108 on the peripheral portion 104 and the pattern on the rear face 106 provides for a durable and lightweight housing 100. For example, the areas in which the structural material 110 is absent may provide for a minimum number of fiber layers to be used in the core material 108 and a reduction in weight of the housing 100, for example a reduction of about 5-10 grams depending on the size of the housing 100. Thus, the housing 100 can be thinner and lighter than that of previous devices, while providing adequate strength and stiffness properties.

The structural material 110 also provides strength to the housing 100. For example, the structural material 110 present on the peripheral portion 104 and forming the pattern illustrated in FIG. 1 on the rear face 106 provides strength and stiffness to the housing 100, assists in maintaining torsional strength of the housing 100, and assists in maintaining strain levels, for example, in impacts of less than 3% of strains. It should be appreciated that the amount of the area of the rear housing 102 of the housing 100 including the structural material 110 may depend on the weight and geometry of the device incorporating the housing 100. In general, it is desirable to increase the strength of the corners (such as corners 104a-d) to cause the device incorporating the housing 100 to meet applicable drop tests, tumble tests, and other tests of the type.

The combination of the structural material 110 and the core material 108 protects a display of the housing 100 and enhances the stiffness across a plain of the rear housing 102 to protect internal components housed within the housing 100, such as a battery, antenna, processor, connection ports, expansion ports for memory, button peripheries, microphone, camera, speakers, other components, and/or to protect a front face of the device such as a glass face of a display, as discussed below. The structural material 110 also surrounds connections ports present on the peripheral portion 104 to provide strength to the connection ports, such as a universal serial bus (USB) or micro USB type port 112, a headphone port 114, a power input port 116, and other ports of the type. In an aspect, the rear housing 102 may also include an area 118 devoid of the structural material 110 providing a type of window for an antenna of the computing device. Other areas of the rear housing 102 may be devoid of the structural material 110 to allow for other components and internal performance, such as for a battery, camera, etc.

Figure 2:
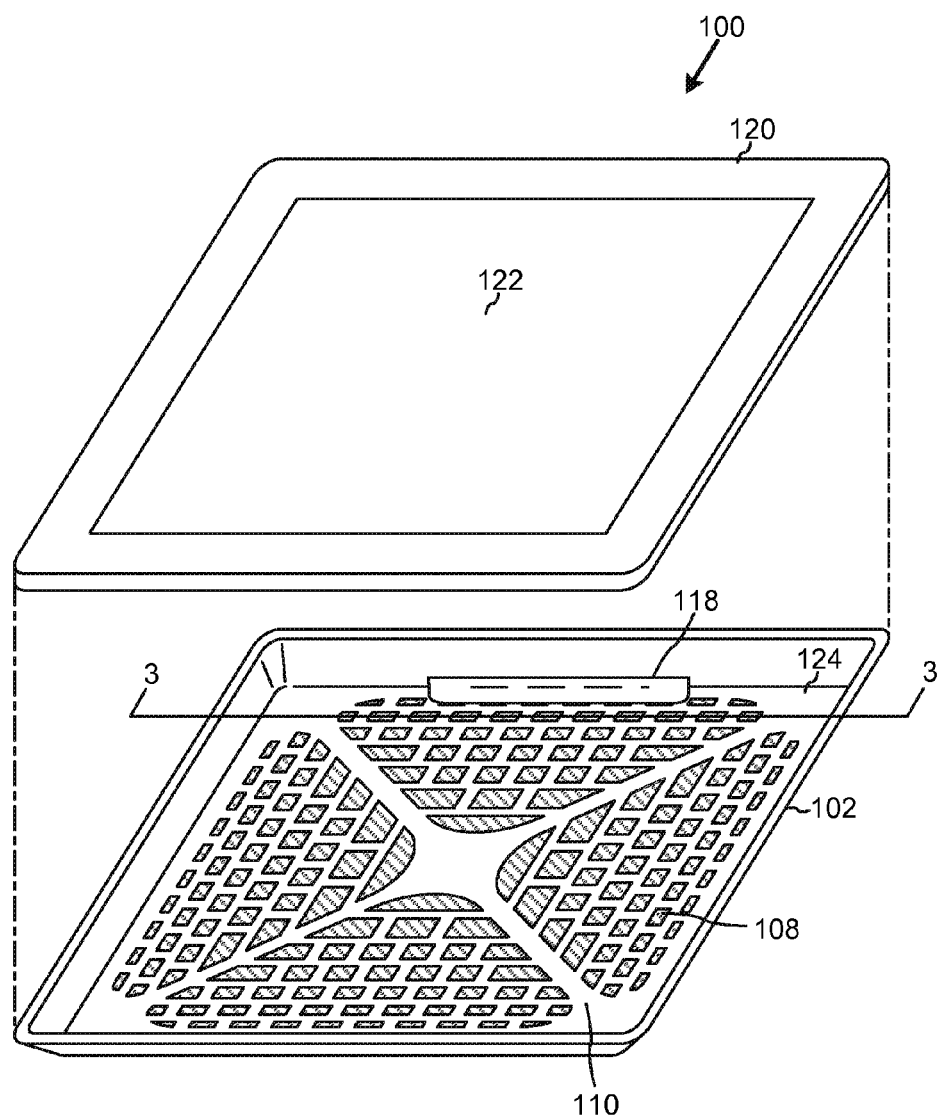
FIG. 2 illustrates an exploded view of the device housing of FIG. 1 according to an aspect of the disclosure.
Figure 3:
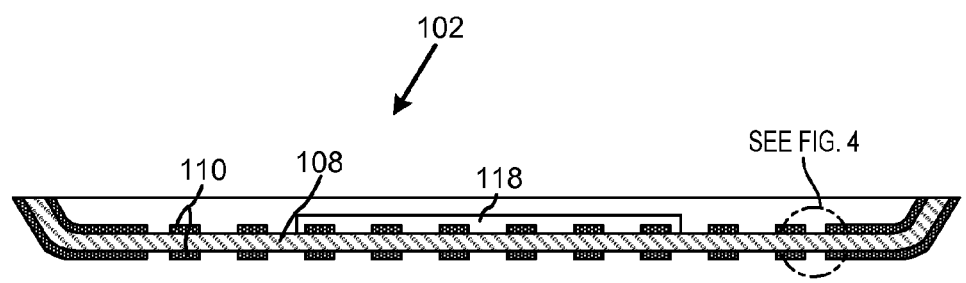
FIG. 3 illustrates a sectional view of the rear housing portion of FIG. 2 taken along line 3-3 according to an aspect of the disclosure.

Referring to FIG. 2, the housing 100 may include the rear housing 102 and a front housing 120. The front housing 120 may support a screen or display 122. In one aspect the front housing 120 may be comprised entirely of the display material 122. The front housing 120 and the rear housing 102 are coupled together and house internal components of the computing device, such as those components described below with reference to FIG. 17. For example, the rear housing 102 may be mechanically coupled to the front housing 120 around a periphery of the rear housing 102.

The front housing 120 may be coupled to the rear housing 102 and may extend over the rear housing to be flush with an exterior perimeter of the side of the rear housing 102. In this aspect, the entire front housing 120 may be a display screen that has substantially the same size as an outer perimeter of the rear housing 102. This can allow for a display screen substantially the same size as the computing device and provided a streamlined look to the computing device.

In another aspect, the front housing 120 may be coupled to the rear housing 102 to fit within an interior perimeter of the rear housing 102. In this aspect, the outward face of the front housing 120 may be flush with the upward facing edge of the frame of the rear housing 102. As described above, the front housing 120 may be a display screen. In this aspect, the perimeter of the rear housing 120 may provide protection to the outer edges of the front housing 120 to prevent damage to the edges of the display screen. The front housing 120 may be coupled to the rear housing 102 using techniques known in the art.

The rear housing 102 may also include an internal face 124 that has a similar pattern of structural material 110 to the rear face 106. In this respect, the core material 108 may be sandwiched between the structural material 110. While the internal face 124 and the rear face 106 are illustrated in FIGS. 1 and 2 as having the structural material 110 arranged in a similar pattern, the internal face 124 and the rear face 106 may have differing patterns. For example, the internal face 124 may include areas in which the structural material 110 is present to protect one or more internal components of the computing device, assist in heat dissipation, etc.

FIGS. 3-7 illustrate sectional views of the rear housing. The core material 108 of the rear housing 102 may be a monolithic single piece structure and may be injection molded, forged, die cast, or cut using a computer numerical control (CNC) machine to the desired shape. As illustrated, the rear housing 102 includes the core material 108 and one or more areas on the core material 108 coated with the structural material 110 on one or more sides of the core material 108. There is also the area 118 devoid of the structural material 110 that provides the type of window for components of the computing device (such as an antenna) that may experience interference due to proximity to metallic materials such as the structural material 110. It should be appreciated that the area 118 may be located in other portions of the rear housing 102 depending on the location of the antenna or other components.

Figure 4:
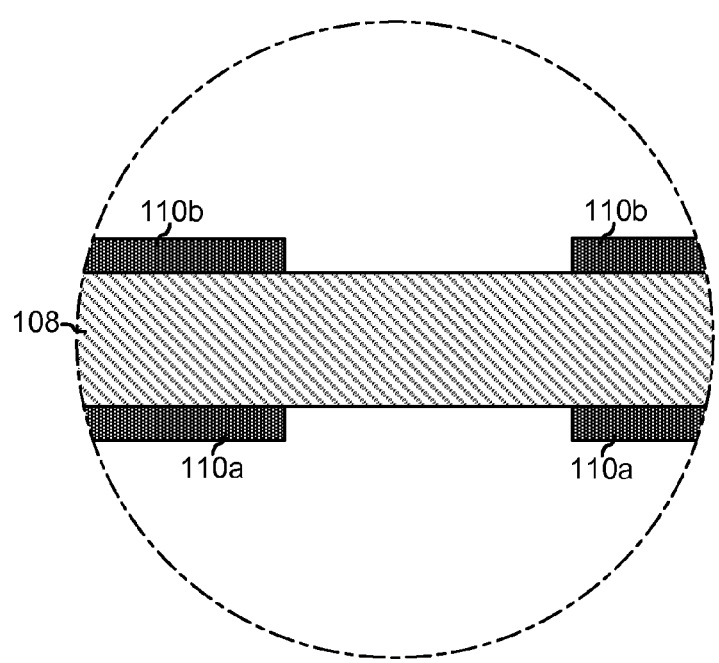
FIG. 4 illustrates an enlarged sectional view of the rear housing portion of FIG. 3 according to an aspect of the disclosure.
Figure 5:
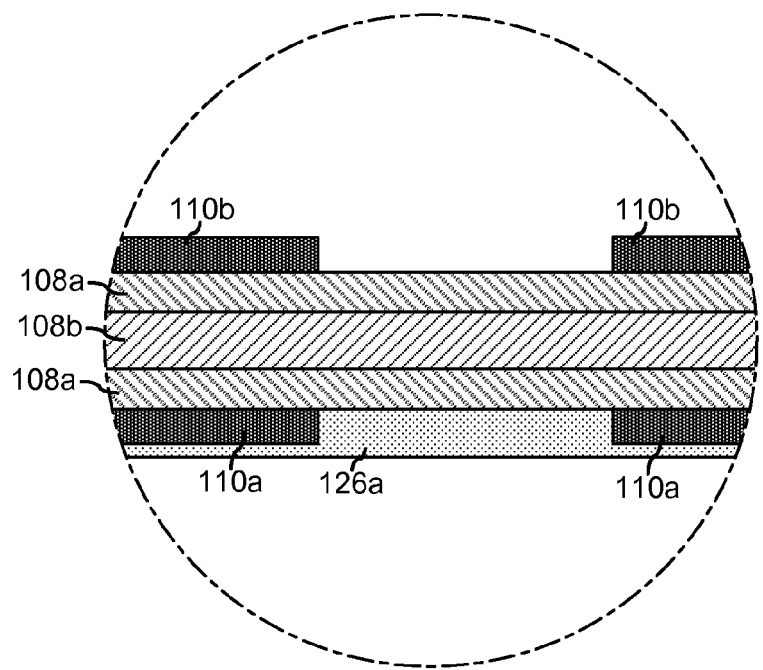
FIG. 5 illustrates an enlarged sectional view of a rear housing portion according to another aspect of the disclosure.

As illustrated in FIG. 4, the rear housing 102 may include the core material 108, a first structural material layer 110a disposed on a first side of the core material 108, and a second structural material layer 110b disposed on a second side of the core material 108. The structural material layers 110a and 110b provide structural stiffness to the core material 108. As illustrated in FIG. 5, the core material 108 may include more than one layer. For example, the core material may include two first core layers 108a with a second core layer 108b sandwiched between the two first core layers 108a. The second core layer 108b may be an open or closed cell, rigid or flexible, foam, for example, elastomeric foam, ridged or flexible polyurethane foam, thermoset foam (i.e. foam that cures upon application of heat), syntactic foam (for example, a glass sphere filled plastic), or other foam or combinations thereof. The two first core layers 108a may be a fiber, for example, glass fiber (i.e., comprised of fine fibers of glass), carbon fiber (i.e., comprised of carbon atoms), fiberglass (i.e., comprised of a polymer reinforced with glass fibers), aramid fiber such as Kevlar (i.e., comprised of fibers in which chain molecules are highly oriented along the fiber axis), organic fiber (i.e., flax, cellulose, wood-pulp, and other such fibers), ceramic fiber, metallic fiber, or other fiber of the type or combinations thereof.

Figure 6:
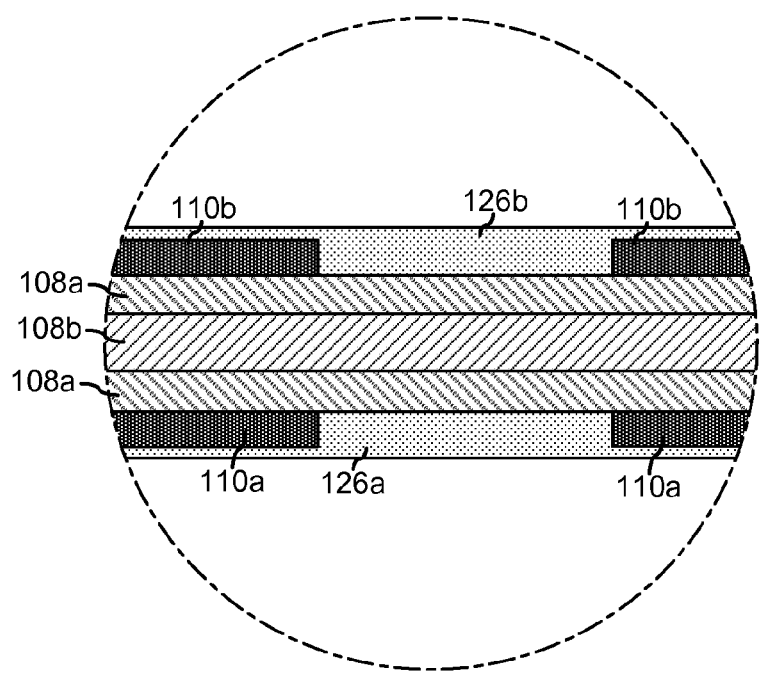
FIG. 6 illustrates an enlarged sectional view of a rear housing portion according to another aspect of the disclosure.
Figure 7:
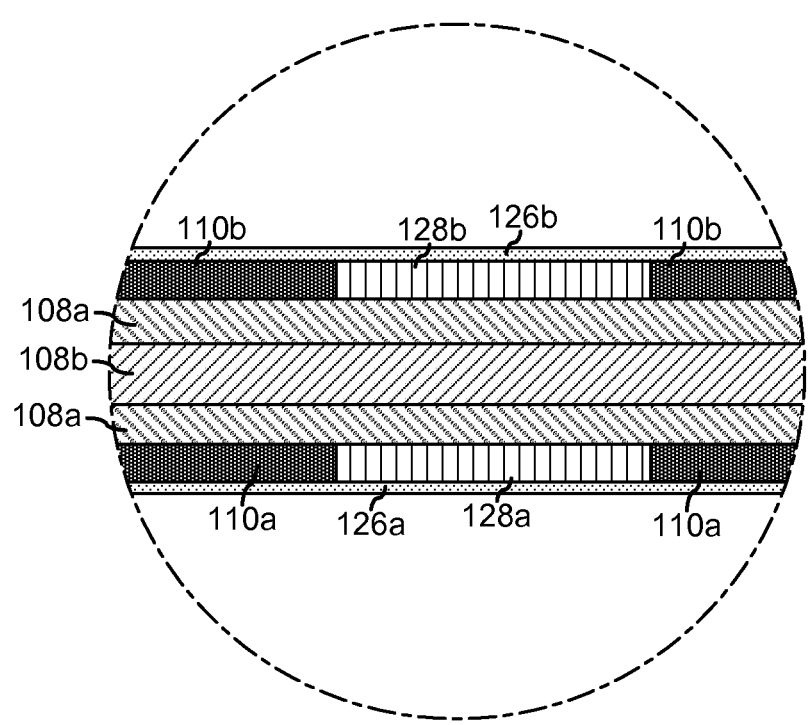
FIG. 7 illustrates an enlarged sectional view of a rear housing portion according to another aspect of the disclosure.

As illustrated in FIG. 5, there may also be an external layer 126a disposed on a first side of the first core layer 108a and covering the first structural material layer 110a. This external layer 126a may be a paint layer, for example, including one or more primers, paints, inks, etc. to provide aesthetic features to the housing 100. The external layer 126a may also act as a sealing layer to protect the structural material layer 110a and the core material 108. Another external layer 126b may also optionally be applied to the internal face of the rear housing 102, i.e., on the second side of the rear housing 102, as illustrated in FIG. 6. The rear housing 102 may also include one or more filler materials 128a and/or 128b that may be disposed between the core material 108/108a and the external layers 126a and 126b, as illustrated in FIG. 7.

Different numbers (or types) of layers may be applied to the side of the rear housing 102 that will be facing electrical components (i.e., the "b" side toward the upper portion of FIGS. 4-7) than to the side of the panel that may be facing the exterior of a device (i.e., the "a" side toward the lower portion of FIGS. 4-7). Thus, a different measure of protection may be provided to different faces of the rear housing 102 that may be exposed to different types of stresses. The rear housing 102 may have a thickness of about 500 microns to about 1000 microns, and more specifically, about 800 microns. However, it should be appreciated by those skilled in the art that the thickness of the rear housing 102 may be varied and adapted to various uses.

Further, the layers disposed on the core material 108 to provide structural support may be comprised of different materials based on the desired properties. For example, heat dissipation properties of the layer proximal to internal components of the computing device (such as the layer(s) 126b and/or 110b of FIGS. 4-7) may be important, while hardness and durability of the layer proximal to or forming the external surface of the rear housing 102 (such as the layer(s) 126a and/or 110a of FIGS. 4-7) may be important.

Thus, the different aspects described with reference to FIGS. 4-7 may be combined and or modified to incorporate the aspects of each other.

Figure 8:
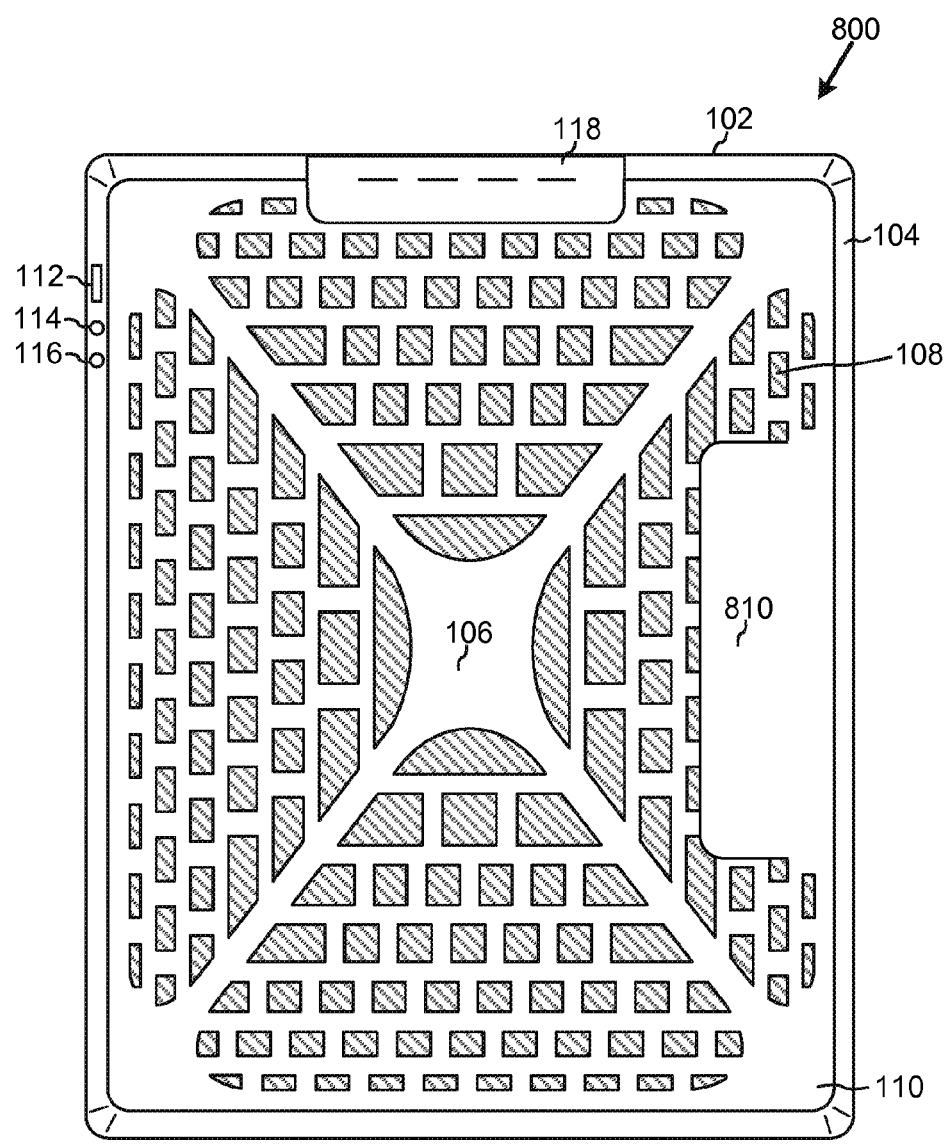
FIG. 8 illustrates a rear view of a device housing according to an aspect of the disclosure.
Figure 9:
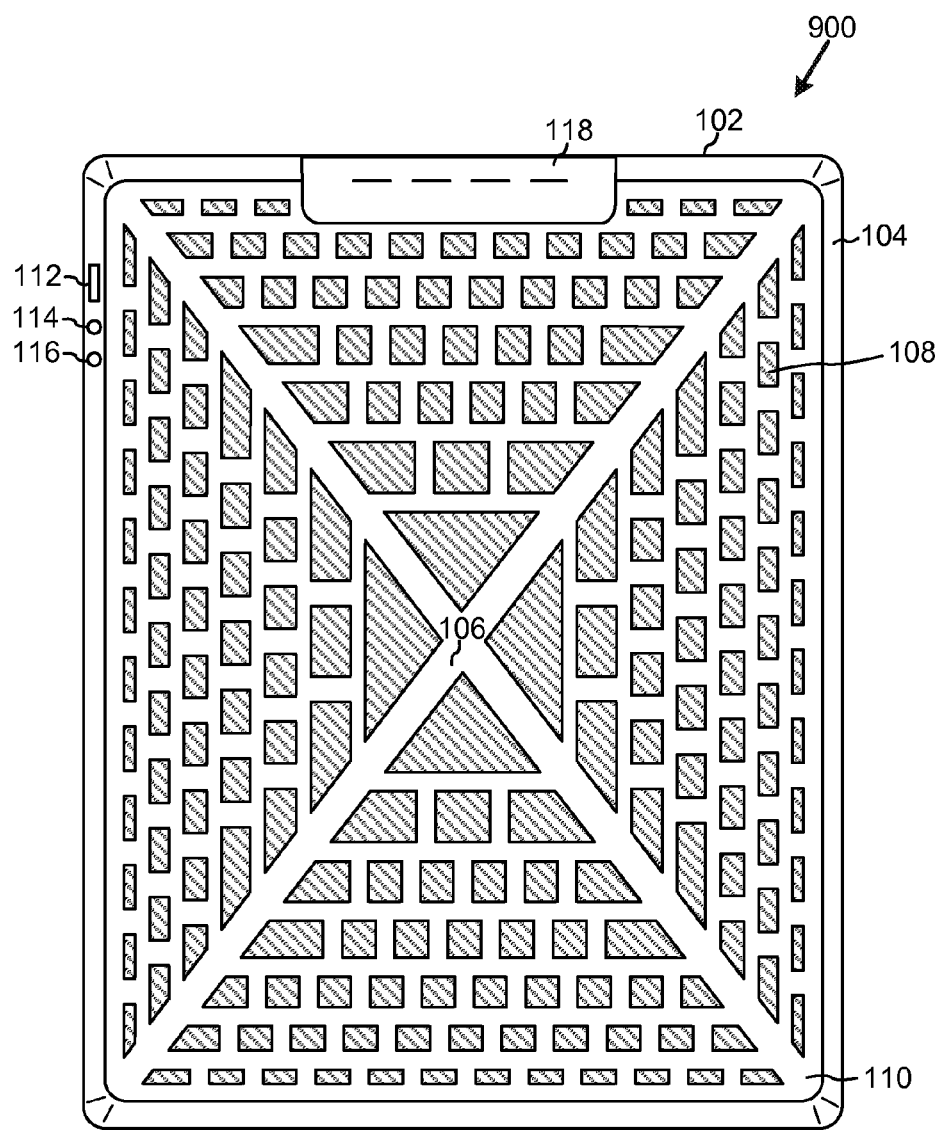
FIG. 9 illustrates another rear view of a device housing according to an aspect of the disclosure.
Figure 10:
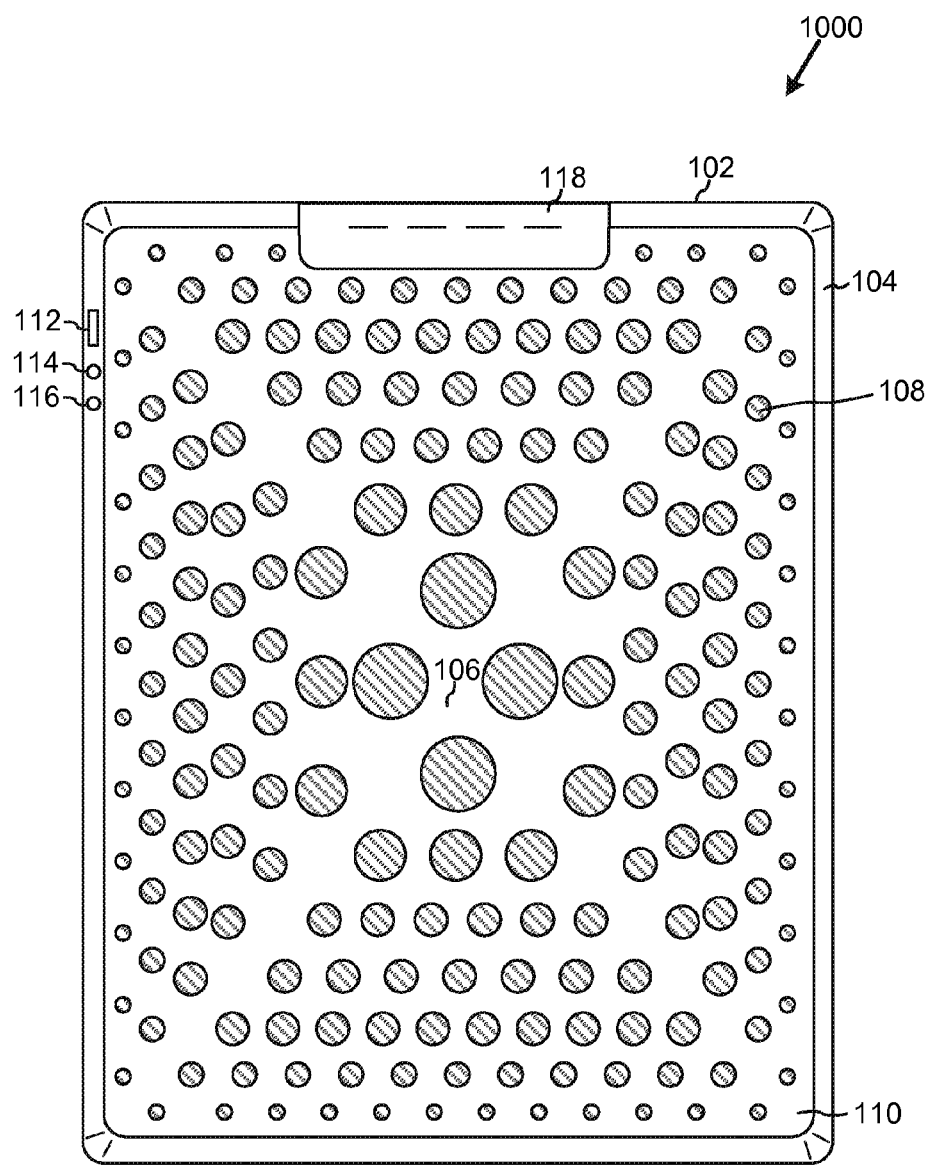
FIG. 10 illustrates another rear view of a device housing according to an aspect of the disclosure.
Figure 11:
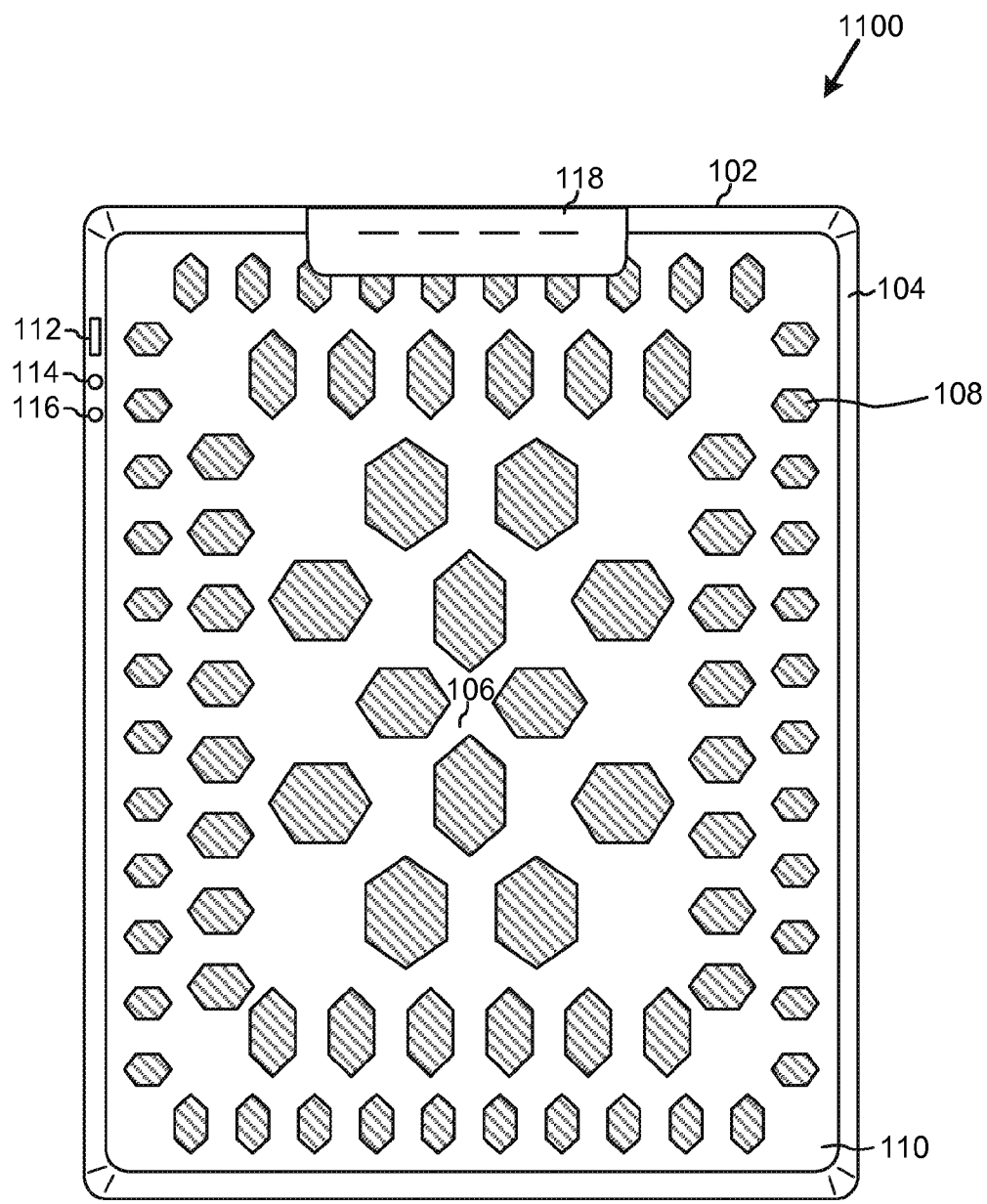
FIG. 11 illustrates another rear view of a device housing according to an aspect of the disclosure.
Figure 12:
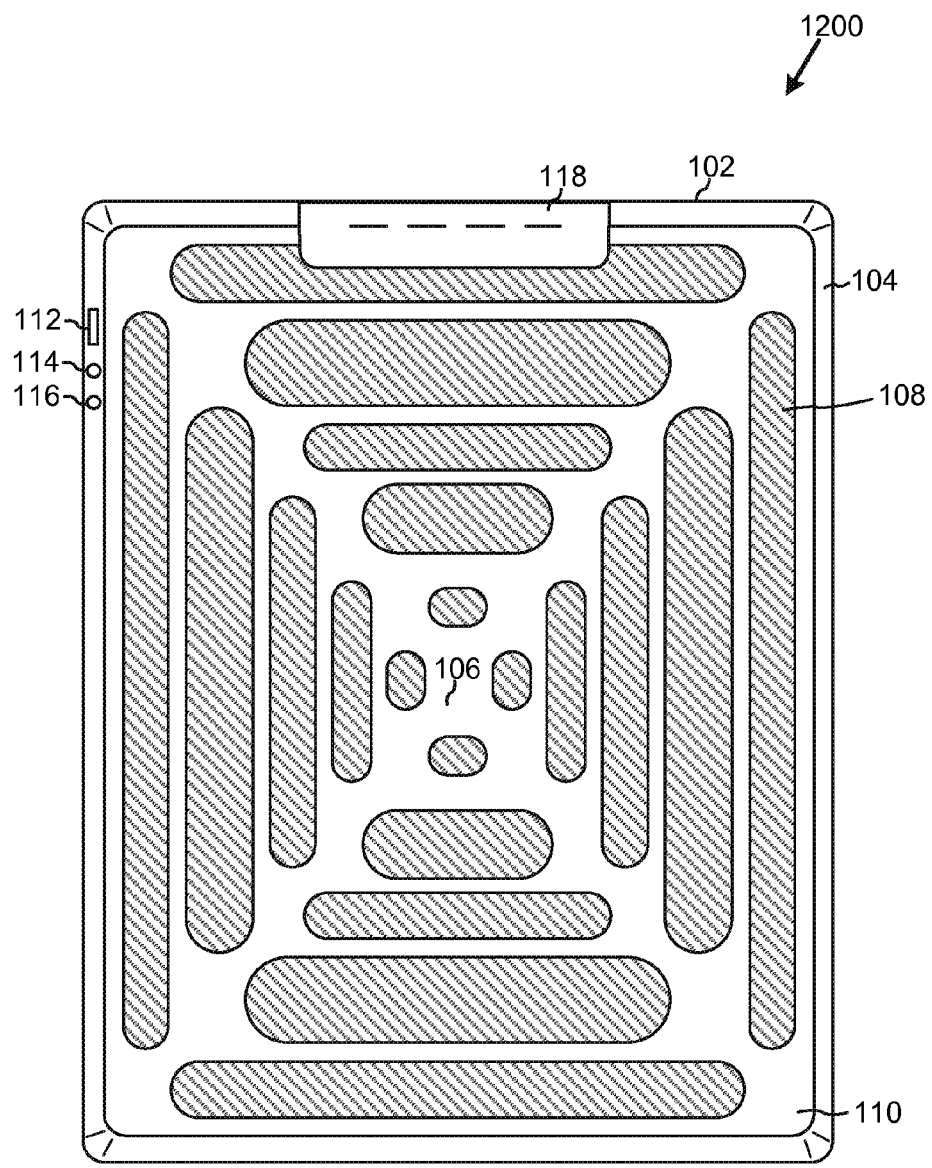
FIG. 12 illustrates another rear view of a device housing according to an aspect of the disclosure.
Figure 13:
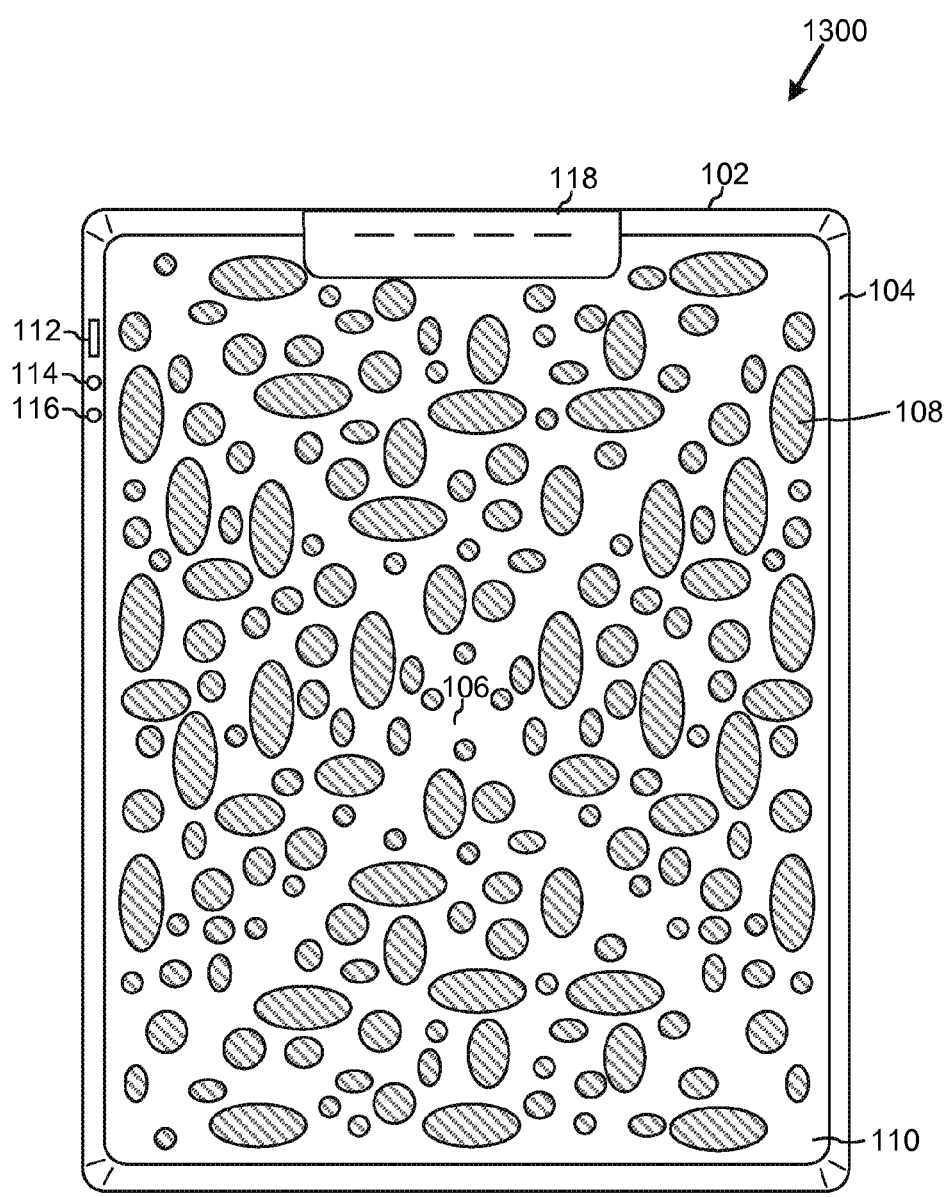
FIG. 13 illustrates another rear view of a device housing according to an aspect of the disclosure.
Figure 14:
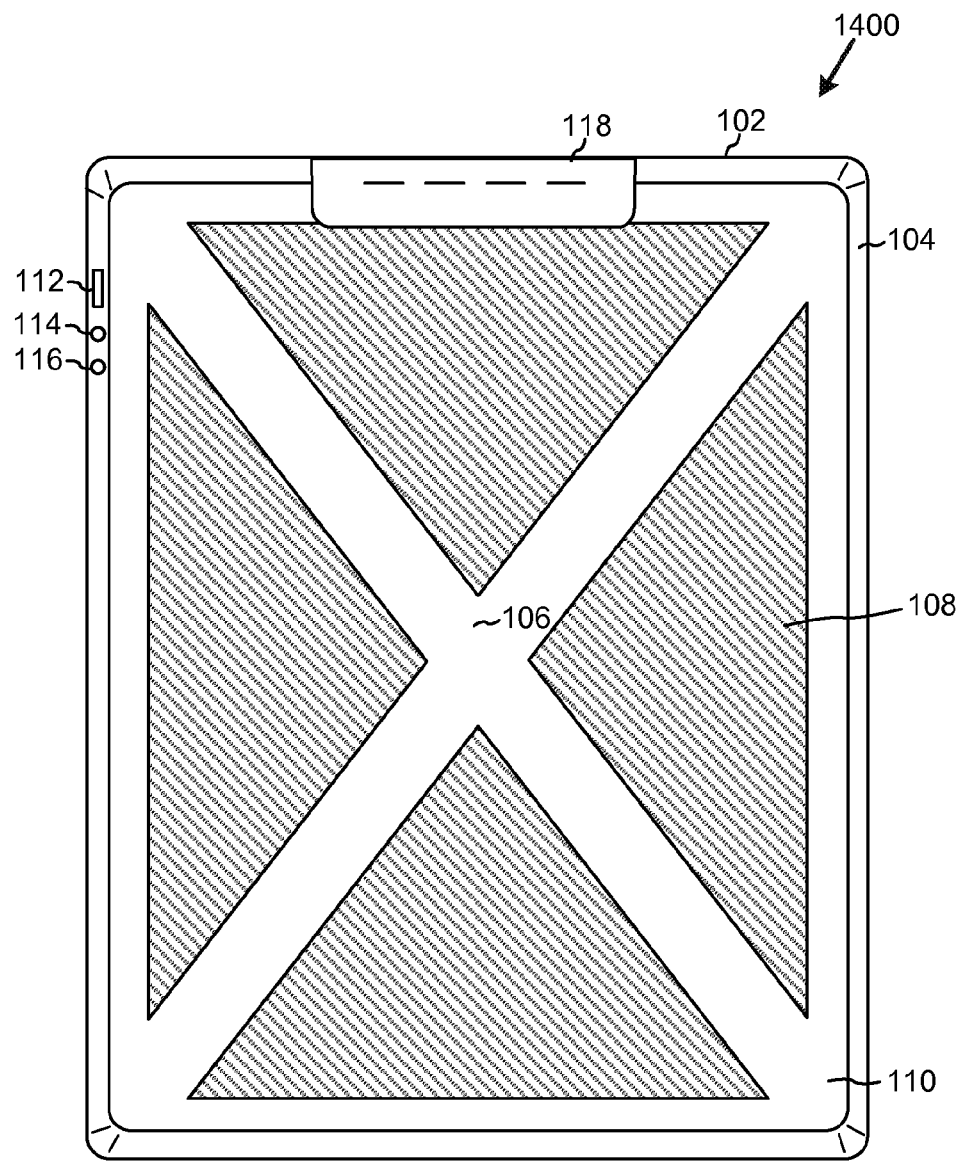
FIG. 14 illustrates another rear view of a device housing according to an aspect of the disclosure.
Figure 15:
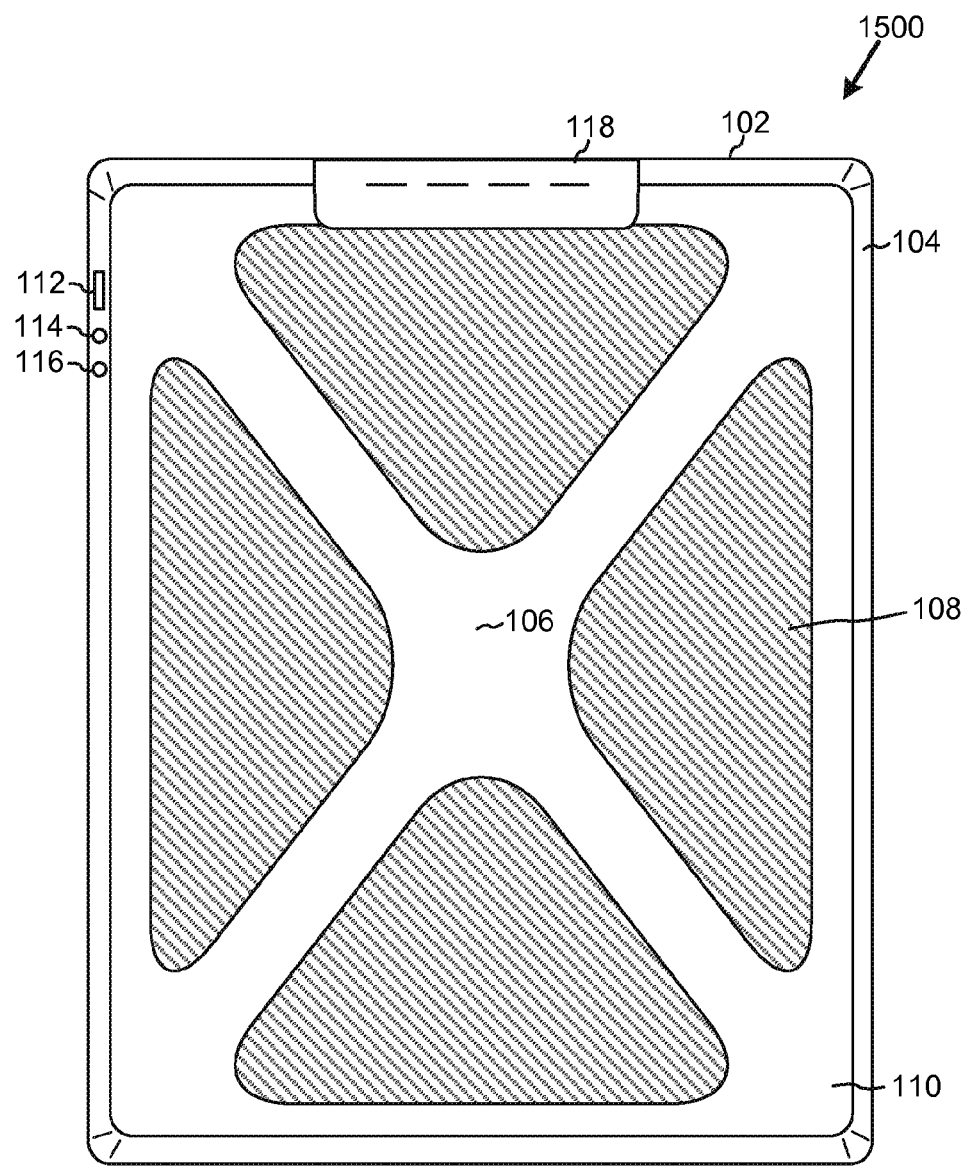
FIG. 15 illustrates another rear view of a device housing according to an aspect of the disclosure.

Referring to FIGS. 8-15, the rear housing 102 may have alternate patterns and have strategic areas where the structural material 110 is located to protect one or more components of the computing device. For example, the rear housing 102 of housing 800 may include an area 810 which includes the structural material 110 to protect a component, such as a battery, processor, and/or other component, of the computing device, as illustrated in FIG. 8. In another example, the rear housing 102 of housing 900 may include a pattern as illustrated in FIG. 9 in which the areas devoid of the structural material 110 increase in size from a periphery of the rear housing 102 toward a center of the rear housing 102. In yet other examples, the shape of the areas devoid of the structural material 110 may be varied. For example, these areas may have circular type shapes as illustrated on the rear housing 102 of housing 1000 of FIG. 10, hexagonal type shapes as illustrated on the rear housing 102 of housing 1100 of FIG. 11, ellipsoidal type shapes as illustrated on the rear housing 102 of housing 1200 of FIG. 12, a combination of circular and ellipsoidal type shapes as illustrated on the rear housing 102 of housing 1300 of FIG. 13, and triangular type shapes as illustrated on the rear housings 102 of housings 1400 and 1500 of FIGS. 14 and 15, respectively.

It should be appreciated that any type of shape can be used to provide the areas devoid of the structural material 110 in accordance with the disclosure, including any polygonal shapes. Further, the shape, position, and layout of the areas devoid of the structural material 110 may be randomized (not symmetric), for example, similar to FIG. 13. Randomizing the areas devoid of the structural material 110 can reduce the amount of bending axes of the housing, thereby providing stiffness and strength to the housing.

Figure 16:
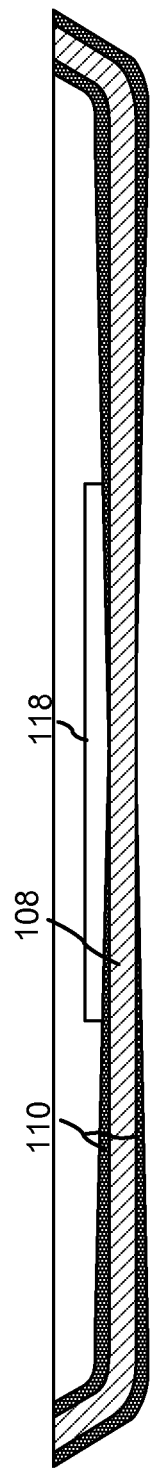
FIG. 16 illustrates a sectional view of another rear portion of a device housing according to an aspect of the disclosure.

Referring to FIG. 16, a thickness of the structural material 110 may decrease from a periphery of the rear housing 102 toward a center of the rear housing 102. This technique may be applied to any of the embodiments and patterns described and illustrated herein. In an aspect, the thickness of the structural material 110 may be in the range of about 120 microns to about 20 microns. However, it should be appreciated that the thicknesses may be higher than 120 microns and lower than 20 microns depending on the size and shape of the housing, as well as the desired application of the housing.

Figure 17:
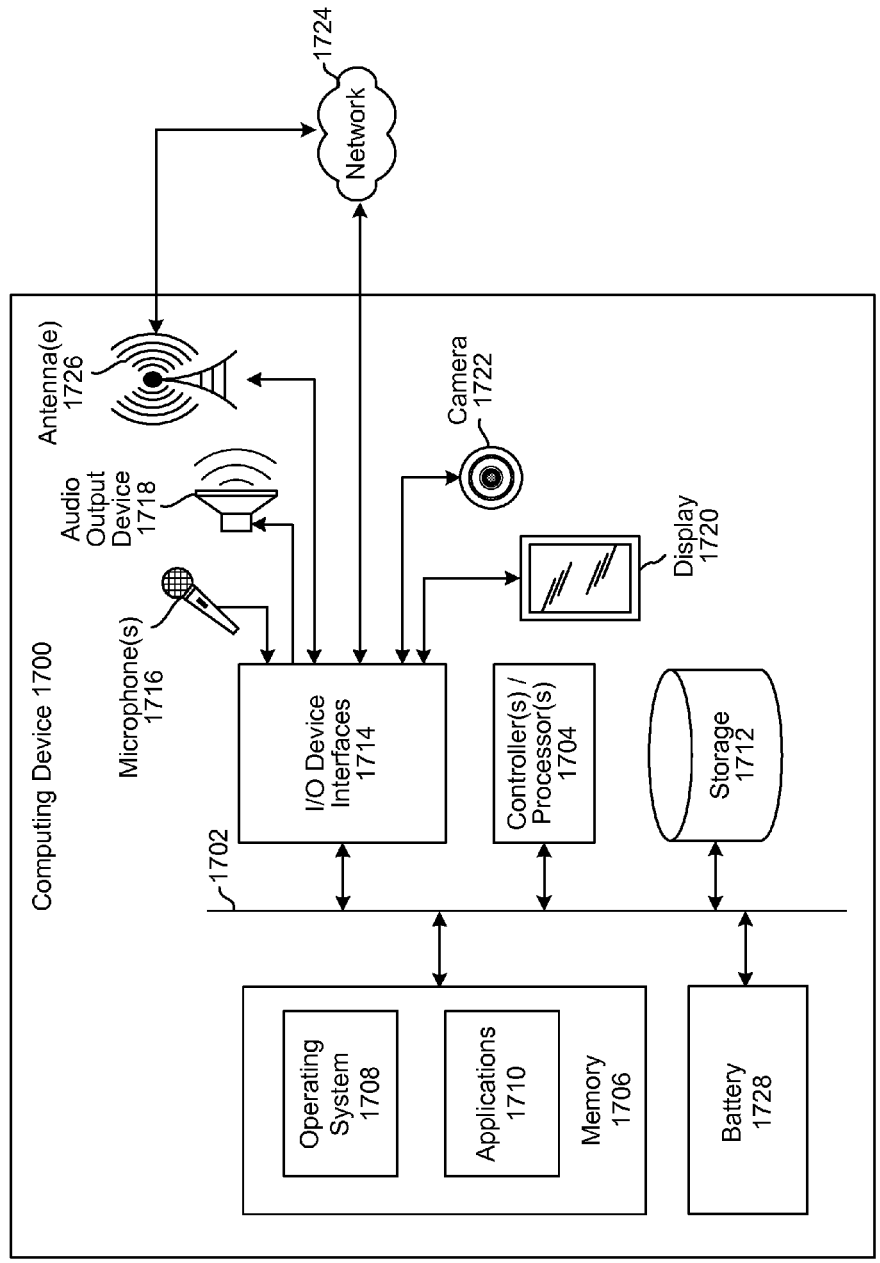
FIG. 17 illustrates a block diagram conceptually illustrating a computing device according to one aspect of the present disclosure.

As described above, the housing 100 may be a housing for a computing device. FIG. 17 is a block diagram conceptually illustrating example components which may be housed in the housing 100 to form a computing device 1700. The computing device 1700 may include computer-readable and computer-executable instructions that reside on the computing device 1700, as is discussed further below.

The computing device 1700 may include an address/data bus 1702 for conveying data among components of the computing device 1700. Each component within the computing device 1700 may also be directly connected to other components in addition to (or instead of) being connected to other components across the bus 1702.

The computing device 1700 may include one or more controllers/processors 1704 that may each include a central processing unit (CPU) for processing data and computer-readable instructions, and a memory 1706 for storing data and instructions, including an operating system 1708 and one or more applications 1710. The memory 1706 may include volatile random access memory (RAM), non-volatile read only memory (ROM), non-volatile magnetoresistive (MRAM) and/or other types of memory. The computing device 1700 may also include a data storage component 1712, for storing data and controller/processor-executable instructions. The data storage component 1712 may include one or more non-volatile storage types such as magnetic storage, optical storage, solid-state storage, etc. The computing device 1700 may also be connected to removable or external non-volatile memory and/or storage (such as a removable memory card, memory key drive, networked storage, etc.) through input/output device interfaces 1714.

Computer instructions for operating the computing device 1700 and its various components may be executed by the controller(s)/processor(s) 1704, using the memory 1706 as temporary "working" storage at runtime. The computer instructions may be stored in a non-transitory manner in non-volatile memory 1706, storage 1712, or an external device. Alternatively, some or all of the executable instructions may be embedded in hardware or firmware in addition to or instead of software.

The computing device 1700 includes input/output device interfaces 1714. A variety of components may be connected through the input/output device interfaces 1714. For example, the computing device 1700 may include one or more audio capture device(s), such as a microphone or an array of microphones 1716, for receiving and capturing audible commands and other audio. The computing device 1700 may also include an audio output device for producing sound, such as speaker(s) 1718. The audio capture device(s) and/or the audio output device may be integrated into the computing device 1700 or may be separate.

The computing device 1700 may include a video output device, such as a display 1720. The display 1720 may be a display of any suitable technology, such as a liquid crystal display, an organic light emitting diode display, electronic paper, an electrochromic display, a cathode ray tube display, a pico projector or other suitable component(s). The computing device 1700 may also include a video/image capture device for capturing images and video, such as camera 1722. The video output device and/or video/image capture device may be integrated into the computing device 1700 or may be separate.

The input/output device interfaces 1714 may also include an interface for an external peripheral device connection such as universal serial bus (USB), FireWire, Thunderbolt or other connection protocol. The input/output device interfaces 1714 may also include a connection to one or more networks 1724 via an antennae 1726, Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The computing device 1700 may also include a power source, such as battery 1728, for providing power to the components of the computing device 1700. The power source may be integrated into the computing device 1700, in the form of battery 1728. The power source may additionally or alternatively be external to the computing device 1700 and connected to the computing device 1700 using a power cord that interfaces with the power source, such as a USB connection port, a wall outlet receptacle, etc.

Figure 18:
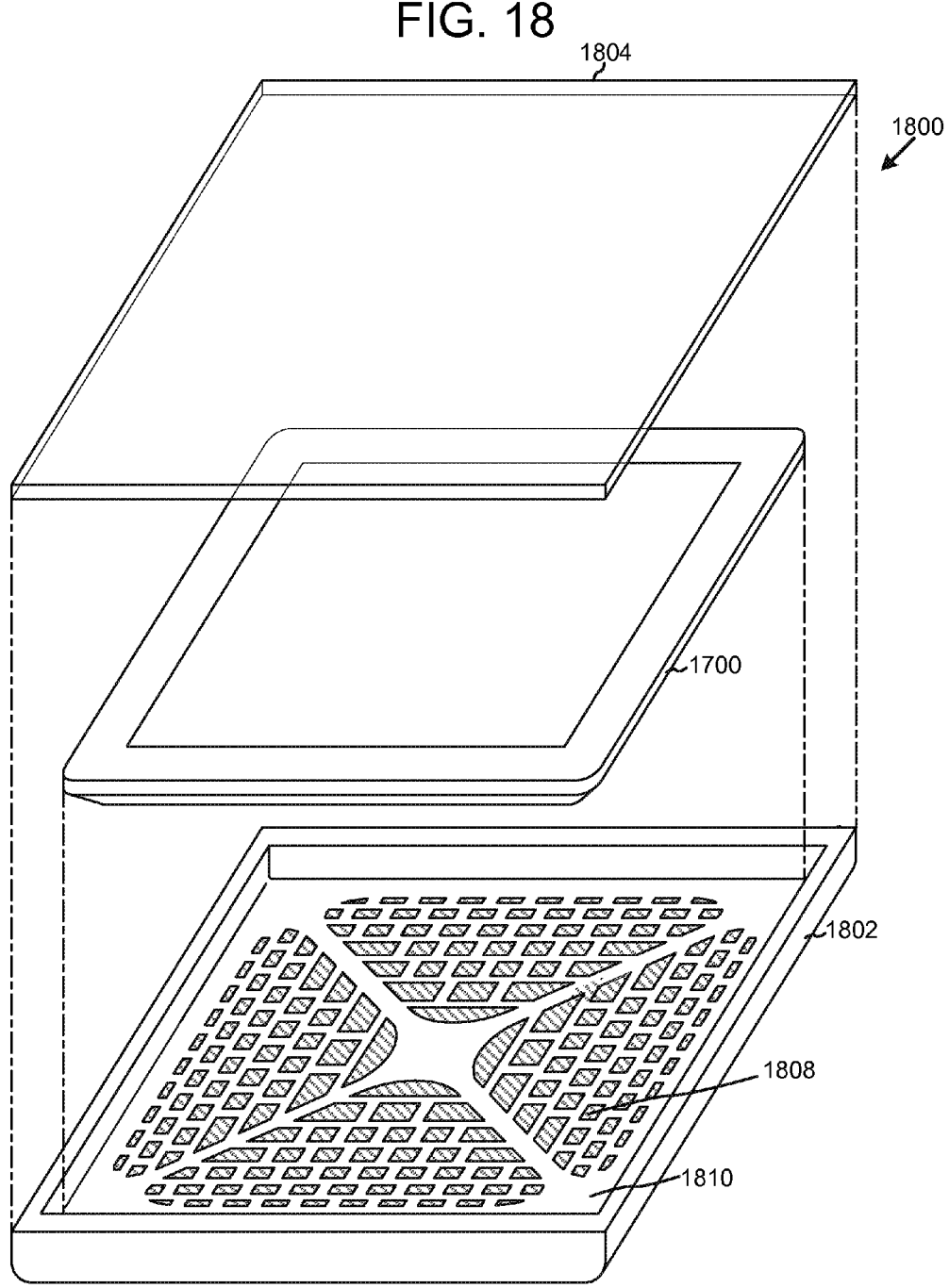
FIG. 18 illustrates a device case according to an aspect of the disclosure.

In another aspect, a similar approach as described above for a housing of a computing device may also be used to make external cases for electronic devices, such as the computing device 1700 described above. FIG. 18 illustrates such a case 1800 including the computing device 1700 therein. The case 1800 may be an aftermarket accessory purchased separately from the computing device 1700 and attached (and unattached) by a user. As illustrated, the case 1800 includes a rear portion 1802 and a front portion 1804. The front portion 1804 and the rear portion 1802 may be coupled together to enclose the computing device 1700. In this aspect, the rear portion 1802 includes a core material 1808 and a structural material 1810 covering the core material 1808 in selected areas of the rear portion 1802 as described above. The front portion 1804 may be a cover that is coupled to the rear portion 1802 by a hinge to allow the cover to be opened. The front portion 1804 may be a cover that surrounds a front edge of the computing device 1700 to allow the screen of the computing device 1700 to be exposed. The case 1800 may also be configured to join the front and rear portions 1802 and 1804 and to enclose the computing device 1700, in various other ways as with typical case covers.

Figure 19:
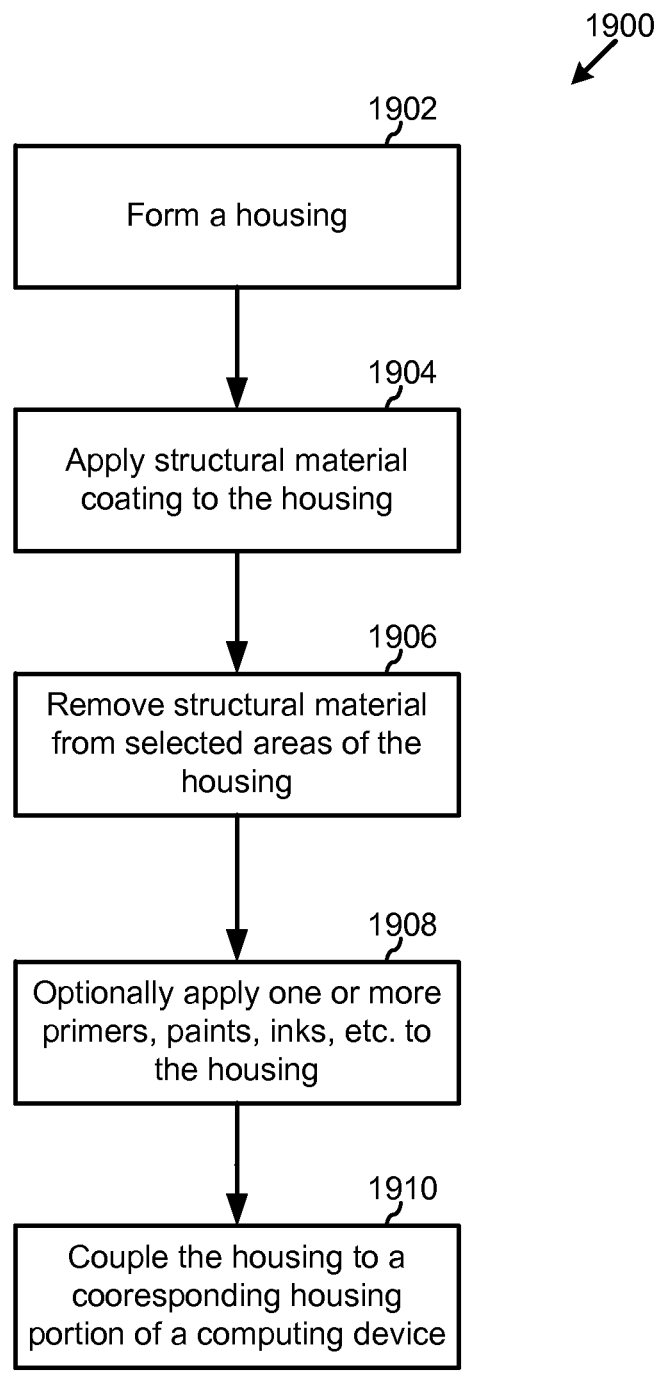
FIG. 19 illustrates a flow diagram illustrating an exemplary method for making a device housing according to aspects of the present disclosure.

Creating an enclosure, such as a housing or cover, out of the combination of the core material and structural material provides a component that is capable of handling drop tumbles and other user abuses, but with an overall reduced weight. In an aspect, the components described herein including the rear housing may be manufactured using a variety of methods. FIG. 19 illustrates an exemplary method for making a device housing according to an aspect of the present disclosure. In block 1902, a housing, such as a rear housing portion, is formed. The rear housing portion may be formed out of the core material, for example, using die cast, injection molding, forging, CNC machining, or other techniques.

A structural material (as described above) is applied to the core material, illustrated as block 1904. For example, the structural material may be electroplated on the core material, painted on, etc. Then the structural material is removed from the core material in one or more selected areas, as described above, illustrated as block 1906. In an aspect, the structural material may be removed using a photolithography type process, electrochemical etching process, and other processes of the type. For example, a coating of photo resist type material may be disposed on the structural material, and the photo resist coating may be developed using ultraviolet (UV) light, a laser, etc. in the areas at which the structural material is to remain. The remaining photo resist coating (i.e., the undeveloped areas of the photo resist coating at which the structural material is to be removed) is then removed. The structural material may then be removed from the core material using an electrochemical etching process (for example using acids).

Additionally, as described above, optionally one or more additional layers may be applied, for example to provide aesthetic functionality to the housing, illustrated as block 1908. For example, a coating or skin may be applied to the housing to provide a single piece housing that has a streamlined and aesthetically pleasing look and feel. The coating may also provide additional functions of increased toughness and durability.

A computing device may then be assembled using the housing, for example, by coupling the rear housing portion to a corresponding housing portion, such as a front housing, and enclosing components of the computing device therein, illustrated as block 1910.

While the reinforced structural composite is described with reference to housing components of computing devices, other components of other device may be made in a similar manner as described above. For example, cases for devices, components for toys, automobiles, watercraft, furniture, etc. The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A housing component for an electronic device, the housing component comprising:
   an internal face;
   an external face;
   a core material extending across a plane of the housing component, wherein a strength of the core material is weaker in a first direction than in a second direction; and
   a structural material layered on at least one portion of the core material to provide structural support in the first direction to the core material, wherein the structural material:
      is layered on the core material around at least one connection port of the housing component, and
      is absent from an area of the core material to reduce interference of a transmitting antenna of the electronic device.

2. The housing component of claim 1, wherein:
   the structural material is comprised of at least one of aluminum, titanium, magnesium, stainless steel, nickel, tin, chromium, cobalt, or copper; and
   the core material is a fiber based material having strength properties corresponding to a direction of orientation of axes of fibers of the fiber based material.

3. The housing component of claim 1, wherein the structural material is layered on the at least one portion of the core material toward the external face of the housing component.

4. The housing component of claim 1, wherein the structural material is layered on the at least one portion of the core material toward the internal face of the housing component.

5. The housing component of claim 1, wherein the structural material is layered on the at least one portion of the core material at a periphery of the housing component.

6. The housing component of claim 1, wherein the structural material is layered on the at least one portion of the core material to form a pattern having areas absent the structural material that increase in surface area from proximal to a periphery of the housing component in a direction toward a center of the housing component.

7. The housing component of claim 1, wherein the structural material is layered on the at least one portion of the core material from a periphery of the housing component toward a center of the housing component and decreases in thickness from the periphery toward the center.

8. The housing component of claim 1, wherein the structural material is layered on the at least one portion of the core material at a location corresponding to a position of a component of the electronic device to protect the component when housed by the housing component.

9. A method of making a component for an electronic device, comprising:
   forming a housing component comprising:
      a core material extending across a plane of the housing component, wherein a strength of the core material is weaker in a first direction than in a second direction,
      a first structural material layered on the core material toward an external face of the housing component, the first structural material providing structural support to the core material, and a second structural material layered on the core material toward an internal face of the housing component, the second structural material providing structural support to the core material; and removing a portion of at least one of the first or second structural materials to reduce a weight of the housing component but maintain structural support of the core material in the first direction.

10. The method of claim 9, wherein the forming step includes plating the first and second structural materials on the core material, and the core material is a fiber based material having strength properties corresponding to a direction of orientation of axes of fibers of the fiber based material.

11. The method of claim 9, wherein the removing step includes removing the portion of the first structural material from a central area of the housing component, leaving a peripheral portion of the first structural material on the housing component.

12. The method of claim 9, wherein the removing step includes removing the portion of the second structural material from a central area of the housing component, leaving a peripheral portion of the second structural material on the housing component.

13. The method of claim 9, wherein the removing step includes removing the portion of both of the first and second structural materials at substantially a same location.

14. The method of claim 9, wherein the removing step includes removing the portion of the first structural material from a central area of the housing component, leaving a connection portion of the first structural material around a connection port of the housing component.

15. The method of claim 9, wherein the removing step includes removing the portion of the first structural material forming a pattern having areas absent the first structural material that increase in surface area from proximal to a periphery of the housing component in a direction toward a center of the housing component.

16. The method of claim 9, wherein the removing step includes removing the portion of the second structural material from a central area of the housing component, leaving the second structural material at a location corresponding to a position of a component of the electronic device to protect the component when housed by the housing component.

* * * * *